US008266391B2

(12) United States Patent
Tomlin et al.

(10) Patent No.: US 8,266,391 B2
(45) Date of Patent: *Sep. 11, 2012

(54) METHOD FOR WRITING DATA OF AN ATOMIC TRANSACTION TO A MEMORY DEVICE

(75) Inventors: Andrew Tomlin, San Jose, CA (US);
Sergey A. Gorobets, Edinburgh (GB);
Reuven Elhamias, Sunnyvale, CA (US);
Shai Traister, Sunnyvale, CA (US);
Alan D. Bennett, Edinburgh (GB)

(73) Assignee: SanDisk Technologies, Inc., Plano, TX (US)

(*) Notice: Subject to any disclaimer, the term of this patent is extended or adjusted under 35 U.S.C. 154(b) by 327 days.

This patent is subject to a terminal disclaimer.

(21) Appl. No.: 11/820,617

(22) Filed: Jun. 19, 2007

(65) Prior Publication Data
US 2008/0320245 A1    Dec. 25, 2008

(51) Int. Cl.
*G06F 13/00* (2006.01)
(52) U.S. Cl. ................. 711/154; 711/E12.054
(58) Field of Classification Search ............... 714/103, 714/E11.131, 112, 161; 711/20, 38, 19; 707/102, 707/203
See application file for complete search history.

(56) References Cited

U.S. PATENT DOCUMENTS

| 4,677,606 A | 6/1987 | Ogata et al. |
| 5,321,651 A | 6/1994 | Monk |
| 5,576,989 A | 11/1996 | Kowalski |
| 5,838,614 A | 11/1998 | Estakhri et al. |
| 5,893,118 A * | 4/1999 | Sonderegger ......................... 1/1 |
| 6,185,699 B1 | 2/2001 | Haderle et al. |
| 6,385,744 B1 | 5/2002 | Ando et al. |
| 6,512,702 B1 | 1/2003 | Yamamura et al. |
| 6,535,949 B1 | 3/2003 | Parker |
| 6,564,307 B1 | 5/2003 | Micka et al. |
| 6,601,132 B2 | 7/2003 | Nomura et al. |
| 6,646,921 B2 | 11/2003 | Roohparvar |
| 6,662,334 B1 | 12/2003 | Stenfort |
| 6,751,750 B1 * | 6/2004 | Humlicek ........................ 714/20 |
| 6,754,828 B1 | 6/2004 | Marisetty et al. |
| 7,254,592 B1 * | 8/2007 | Matero ........................ 707/203 |

(Continued)

FOREIGN PATENT DOCUMENTS

EP        0 454 340        10/1991

(Continued)

OTHER PUBLICATIONS

Search Report and Written Opinion for PCT Application No. PCT/US2008/007418, 10 pages, mailed Nov. 14, 2008.

(Continued)

*Primary Examiner* — Edward Dudek, Jr.
*Assistant Examiner* — Sean D Rossiter
(74) *Attorney, Agent, or Firm* — Brinks Hofer Gilson & Lione

(57) ABSTRACT

A method for writing data to a memory device is disclosed. In one embodiment, data of an atomic transaction is written to a first memory in a memory device. A determination is made regarding whether all of the data of the atomic transaction was written to the first memory. The data of the atomic transaction is read from the first memory and written to a second memory in the memory device only if it is determined that all of the data of the atomic transaction was written to the first memory.

22 Claims, 5 Drawing Sheets

U.S. PATENT DOCUMENTS

| | | | |
|---|---|---|---|
| 7,340,651 B2 * | 3/2008 | Coldicott et al. | 714/38 |
| 7,363,540 B2 * | 4/2008 | Patel et al. | 714/19 |
| 2002/0026566 A1 | 2/2002 | Awada et al. | |
| 2002/0069314 A1 | 6/2002 | Miyauchi | |
| 2003/0099134 A1 | 5/2003 | Lasser et al. | |
| 2003/0163663 A1 | 8/2003 | Aasheim et al. | |
| 2004/0095666 A1 | 5/2004 | Asano et al. | |
| 2005/0036390 A1 | 2/2005 | Nakada et al. | |
| 2005/0144362 A1 | 6/2005 | Lin et al. | |
| 2005/0246487 A1 * | 11/2005 | Ergan et al. | 711/113 |
| 2005/0273551 A1 | 12/2005 | Keays | |
| 2007/0016733 A1 * | 1/2007 | Day et al. | 711/152 |
| 2008/0016107 A1 * | 1/2008 | Worrall | 707/102 |

FOREIGN PATENT DOCUMENTS

| | | | |
|---|---|---|---|
| EP | 0 762 282 | | 3/1997 |
| WO | WO/01/31458 | * | 3/2001 |
| WO | WO 01/31458 | | 5/2001 |
| WO | WO 03/010671 A1 | | 2/2003 |
| WO | WO 2006/064498 | | 6/2006 |

OTHER PUBLICATIONS

Office Action for U.S. Appl. No. 12/005,727, dated Feb. 17, 2011, 15 pages.

Office Action for U.S. Appl. No. 12/005,727, dated Oct. 1, 2010, 12 pages.

Office Action for U.S. Appl. No. 11/820,670, dated Aug. 19, 2009, 27 pages.

Office Action for U.S. Appl. No. 11/820,670, dated Feb. 23, 2010, 27 pages.

Office Action for U.S. Appl. No. 11/820,670, dated Nov. 23, 2010, 18 pages.

* cited by examiner

METHOD FOR WRITING DATA OF AN ATOMIC TRANSACTION TO A MEMORY DEVICE

CROSS-REFERENCE TO RELATED APPLICATION

This application is related to "Memory Device with Circuitry for Writing Data of an Atomic Transaction," U.S. patent application Ser. No. 11/820,670, filed herewith, which is hereby incorporated by reference.

BACKGROUND

Atomic transactions are used in a variety of areas, including, for example, security applications and database operations. When data of an atomic transaction is stored, it is preferred that either all of the data of the transaction is stored or none of the data of the transaction is stored. However, a write-abort occurring when data of an atomic transaction is being stored can result in only part of the data of the atomic transaction being stored, which may be highly undesirable. High-level file systems or database systems have mechanisms designed to protect against write-abort, so that, if there is a power failure, the file system or database will "roll back" the stored data to a suitable point. However, such protection does not exist on a portable memory device. A memory device can use a write-abort protection method that will result in only a single sector of data being lost in the event of a power loss. However, in atomic transactions, a single lost sector may cause an incoherent state of the transaction. While a memory device can be equipped with a battery backup to ensure that all of the data of an atomic transaction will be written to the memory device even if a write-abort occurs, a battery would add cost to the memory device.

SUMMARY

The present invention is defined by the claims, and nothing in this section should be taken as a limitation on those claims.

By way of introduction, the embodiments described below provide a method for writing data to a memory device. In one embodiment, data of an atomic transaction is written to a first memory in a memory device. A determination is made regarding whether all of the data of the atomic transaction was written to the first memory. The data of the atomic transaction is read from the first memory and written to a second memory in the memory device only if it is determined that all of the data of the atomic transaction was written to the first memory. Other embodiments are disclosed, and each of the embodiments can be used alone or together in combination.

The embodiments will now be described with reference to the attached drawings.

DETAILED DESCRIPTION OF THE PRESENTLY PREFERRED EMBODIMENTS

Figure 1:
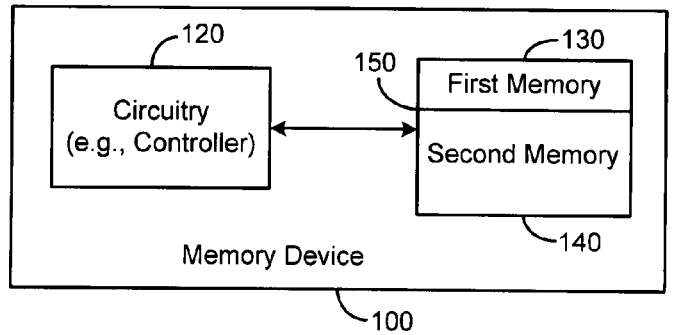
FIG. 1 is an illustration of a memory device of an embodiment.

Turning now to the drawings, FIG. 1 is an illustration of a memory device 100 of an embodiment. The memory device 100 can take the form of a memory card or stick and preferably takes the form of a TrustedFlash™ memory device by SanDisk Corporation. However, it should be understood that these embodiments can be used in any type of memory device. As shown in FIG. 1, the memory device 100 comprises circuitry 120 in communication with a first memory 130 and a second memory 140. As used herein, the phrase "in communication with" means in direct communication with or in indirect communication with through one or more components, which may be named or unnamed herein. For simplicity, the term "circuitry" will be used herein to refer to a pure hardware implementation and/or a combined hardware/software (or firmware) implementation. Accordingly, "circuitry" can take the form of one or more of an application specific integrated circuit (ASIC), a programmable logic controller, an embedded microcontroller, and a single-board computer, as well as a processor and a computer-readable medium that stores computer-readable program code (e.g., software or firmware) executable by the processor. In one presently preferred embodiment, the circuitry 120 takes the form of an ASIC controller running firmware.

In this embodiment, the first and second memories 130, 140 are different parts of a single memory array 150. For example, the first memory 130 can be a hidden partition, and the second memory 140 can be an open partition of the memory array 150. In an alternate embodiment, the first and second memories can each be in a different memory array. In either alternative, it is presently preferred that one or both of the first and second memories be solid-state, non-volatile memories; in particular, flash EEPROM NAND-type memory cells. However, it should be noted that any type of memory can be used, such as, but not limited to, magnetic discs and optical CDs. The memory device 100 can be contain other components, which are not shown in FIG. 1 for simplicity. For example, the memory device 100 can contain components (such as exposed electrical connectors, a wireless transmitter/receiver, etc.) that allow it to be put in communication with a host device, which can take the form of a personal computer (PC), a digital media (e.g., MP3) player, or a cell phone, for example.

There are situations where data of an atomic transaction needs to be stored in the memory device 100. By its very nature, storing data of an atomic transaction should be an all-or-nothing proposition: either all of the data of the atomic transaction should be stored in the memory device 100, or none of the data of the atomic transaction should be stored in the memory device 100. In general, it is better to have none of the data of the atomic transaction stored in the memory device 100 than to have only some of the data of the atomic transaction stored in the memory device 100. One example of an atomic transaction relates to digital rights management (DRM). To protect a file from being read by an unauthorized entity, the file can be encrypted and stored with a cryptographic hash. If the file is updated, the cryptographic hash also needs to be updated. If the file is updated without updating the cryptographic hash, or vice versa, it will appear to the security system of the memory device 100 or host device that the security infrastructure of the file has been corrupted. Accordingly, the updated file and the updated cryptographic hash (i.e., the data of the atomic transaction) need to either both be stored in the memory device 100 or not stored at all. As another example, consider the situation in which the memory device 100 is used to record the transfer of money from one bank account to another. In this situation, the database record for one bank account needs to be updated to reflect an increase in funds, while the database record for the other bank account needs to be updated to reflect a decrease in funds. Accordingly, both of the updates (i.e., the data of the atomic transaction) need to be made, or, if this is not possible, neither of the updates should be made. Otherwise, the accounts will not balance out. Of course, these are merely example and should not be read as limitations on the claims.

In this embodiment, to avoid only some of the data of an atomic transaction from being written to the memory device 100, the data of an atomic transaction is first written to the first memory 130 and is read out of the first memory 130 and into the second memory 140 only if all of the data of the atomic transaction is written to the first memory 130. This enforces an all-or-nothing write policy, so either all of the data, or none of the data, of the atomic transaction is written to the second memory 140. To accomplish this, the circuitry 120 in the memory device 100 of this embodiment is designed to perform the method illustrated in the flow chart 200 of FIG. 2 (or, alternatively, a different method can be used). The circuitry 120 can also provide other functions, such as normal read/write functions, etc. Alternatively, other components of the memory device 100 not shown in FIG. 1 can be used for such other functions.

Figure 2:
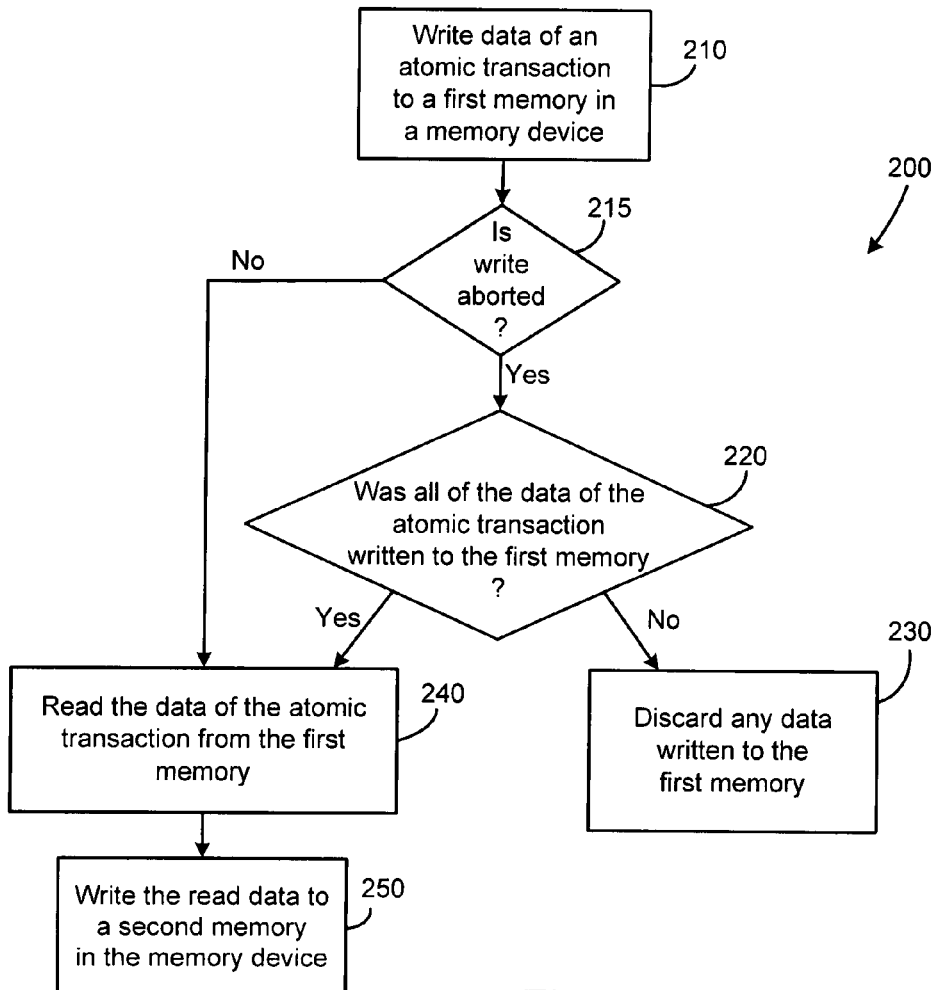
FIG. 2 is a flow chart of an embodiment for writing data of an atomic transaction to a memory device.

Turning now to the flow chart 200 of FIG. 2, the circuitry 120 starts writing data of an atomic transaction to the first memory 130 in the memory device 100 (act 210). As illustrated in the above examples, the data of the atomic transaction can be internally created by the memory device 100 (such as a cryptographic hash) and/or created by a host device or other entity external to the memory device 100 (e.g., a database or file update). In one embodiment, the first memory 130 is a special temporary memory space outside of the user space (i.e., the logical block addressing ("LBA") space), which is in the second memory 140. Because of the temporary nature of the first memory 130 and because it is outside of the user-LBA space of the second memory 140, the temporary storage of the data of the atomic transaction can be stored in the first memory 130 without budgeting extra physical blocks or consuming user-LBA space in the second memory 140. Because this mechanism does not consume any user-LBA space, this embodiment effectively provides atomic transaction protection without consuming any logical space from the host device/file system's perspective. In addition to temporarily storing atomic transaction data, the first memory 130 can be used to store other information, such as, but not limited to, information used for the general operation of the memory device 100 and/or to manage the second memory 140 (e.g., control information such as update blocks and internal tables). Also, while the first and second memories 130, 140 can be any suitable size, in this embodiment, the first memory 130 is smaller than the second memory 140 but large enough to record a limited-length atomic command sequence (e.g., 63 sectors).

The circuitry 120 then determines whether a write abort occurred (act 215). If a write abort did not occur, the circuitry 120 reads the atomic transaction data out of the first memory 130 (act 240) and writes the read data to the second memory 140 (act 250). On the other hand, if a write abort occurred, the circuitry 120 determines whether all of the data of the atomic transaction was written to the first memory 130 (act 220). There are several reasons why all of the data of the atomic transaction may not be written to the first memory 130. For example, a write-abort during the writing of the data may prevent all of the data from being written. A write-abort can be caused by various situations, including, but not limited to, loss of power to the memory device (e.g., if the memory device 100 was removed from a host device that was supplying it power during the write operation), a power cycle of the memory device 100, a write-abort command issued during the write operation, and failure of the target memory cells in the first memory 130 (e.g., if the target memory cells in the first memory were defective and there was not a suitable group of redundant memory cells available). On the other hand, a write abort that occurred after the data was written to the first memory 130 would not prevent all of the data of the atomic transaction from being written to the first memory 130.

The circuitry 120 can use any suitable method to determine whether all of the data of the atomic transaction was written to the first memory 130 (i.e., to determine whether a write-abort occurred during the writing of the data of the atomic transaction). In one embodiment, which will be described in more detail below, a "begin transaction" command at the beginning of the atomic transaction sends all subsequent writes to the first memory 130 until a subsequent "end transaction" command is received. On receipt of the "end transaction" command, a special control flag is written (in the first memory 130 or elsewhere, including outside of the memory device 100) to indicate the transaction is complete. In that embodiment, the circuitry 120 can detect whether a write-abort occurred by checking for the presence of the flag—if data is present in the first memory 130 without the flag being present, a write-abort occurred during the writing of the data of the atomic transaction. As mentioned above, the circuitry can use different techniques to determine whether a write-abort occurred during the writing of the data of the atomic transaction. For example, instead of writing a flag, the last sector of data of the atomic transaction can contain a data structure or some other "end of data" identifier. The presence of such an identifier would indicate that a write-abort did not occur. (The term "indicator" will be used herein to refer to a flag, an identifier, or any other type of indicator.) As another example, the memory device 100 can be equipped with a battery-powered sensor that detects when the memory device 100 loses power and then records a flag in a register to indicate a power loss. In that embodiment, the circuitry 120 can detect that whether a write-abort occurred during the writing of the data of the atomic transaction by checking for the presence of the flag in that register. In yet another embodiment, the circuitry 120 can detect a write-abort by checking the length of the data written to the first memory 130. For example, if atomic transactions written to the memory device 100 have a uniform or expected length (say, 63 sectors), the circuitry 120 can detect a write-abort if fewer than 63 sectors were written to the first memory 130. As another alternative, the circuitry 120 can analyze the data itself to determine if all of the data of the atomic transaction is present. As another example, the presence of any data in the first memory 130 (or in a designated section of the first memory 130) at start-up can be an indication that a write-abort occurred For example, if the data in the first memory 130 is transient and erased after the data is successfully "flushed" to the second memory, the presence of data in the first memory 130 at start-up would indicate that a write-abort occurred. As shown by these numerous examples, any suitable technique can be used to determine whether all of the data of the atomic transaction was written to the first memory 130. None of these examples should be read into the claims unless explicitly recited therein.

Returning to the flow chart 200 in FIG. 2, if the circuitry 120 determines that all of the data of the atomic transaction was not written to the first memory 130, the circuitry 120 discards (e.g., erases, ignores, etc.) any of the data that was written to the first memory 230. This discarding can take place at any suitable time and not necessarily immediately after the circuitry 120 detects a write-abort. If, on the other hand, the circuitry 120 determines that all of the data of the atomic transaction was written to the first memory 130, the circuitry 120 begins reading the atomic transaction data out of the first memory 130 (act 240) and writes that read data to the second memory 140 (act 250). This process will be referred to herein as "flushing" the first memory 130 or "replaying" the data out of the first memory 130 and into the second memory 140.

If the flushing operation is successful, the atomic transaction data that was temporarily stored in the first memory 130 is now in the second memory 140 and, therefore, accessible in the user-LBA space of the memory device 100. However, a write-abort can also occur after all of the data of the atomic transaction is written to the first memory 130 but before or during a flushing operation. In such a situation, the flushing operation can be (re-)performed at any convenient time. (If the flushing operation was in progress when a write-abort occurs, the circuitry 120 can determine the last data written to the second memory 140 and resume the flushing operation from where it left off prior to the write-abort, or the circuitry 120 can start the flushing operation from scratch.) It should be noted that if the flushing operation is performed at startup, the flushing operation may exceed a host timeout period. In such a situation, the flushing operation can be delayed until a suitable time, delayed until the receipt of a special "recover transaction" command (e.g., from the host device or from the circuitry 120), or performed in the background utilizing phased "garbage-collection" techniques. (It should be noted that if a host device is not configured to perform a flushing operation, the flushing operation may not be performed at startup, and the delays associated with performing the flushing operation at startup would be avoided.)

Figure 3:
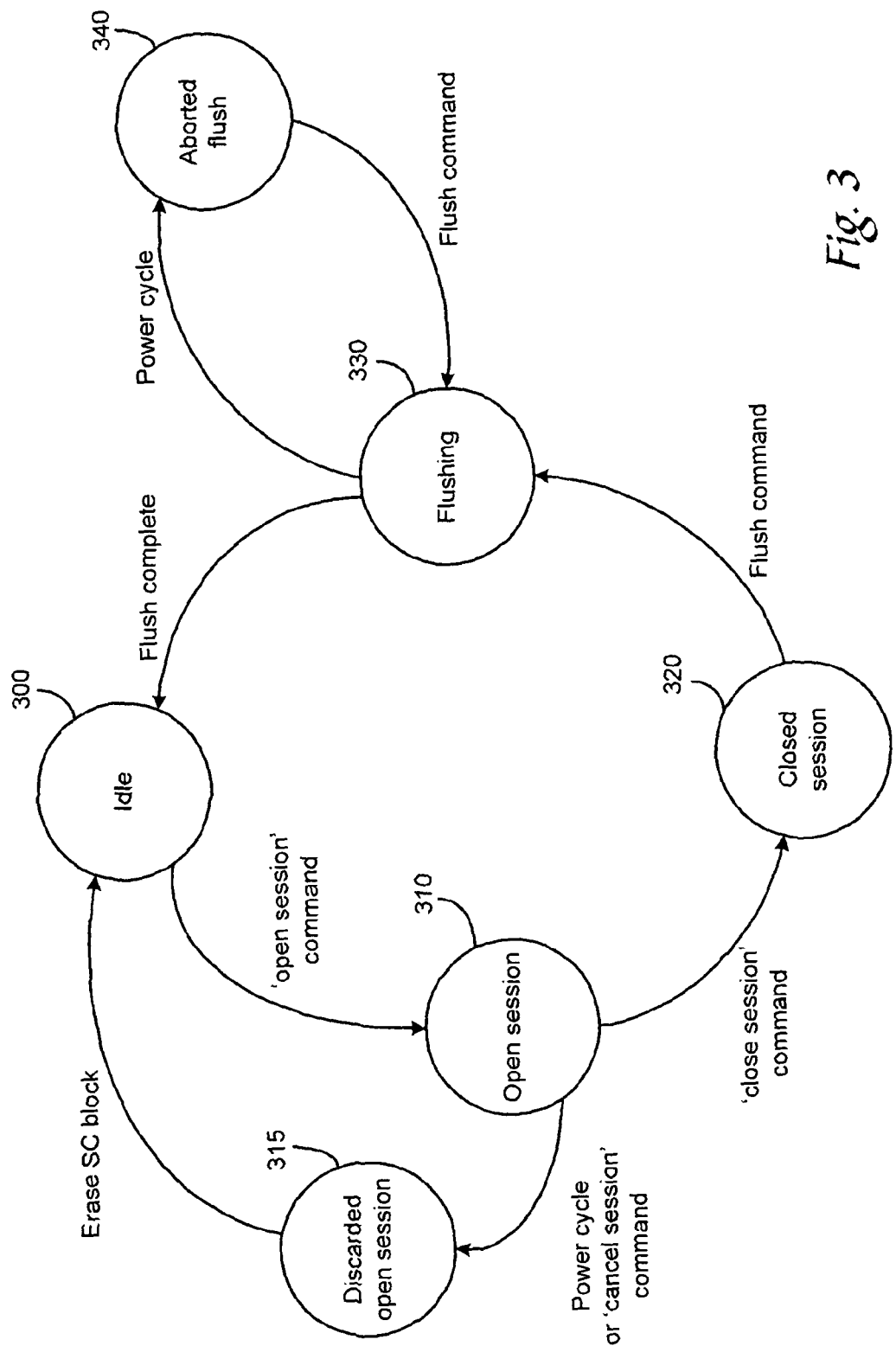
FIG. 3 is a state diagram of an embodiment for writing data of an atomic transaction to a memory device.

Turning again to the drawings, FIG. 3 is a state diagram of the memory device 100. As shown in FIG. 3, the memory device 100 is in an idle mode (state 300) until an "open session" command (i.e., a "begin transaction" command) is received. This command can be sent by an internal application running in the memory device 100 or by a host device, for example. The "open session" command causes the memory device 100 to operate in an open (or "secure") session (state 310). During an open session, the circuitry 120 writes data to the first memory 130 instead of the second memory 140. In this and the subsequent figures, a designated area in the first memory 130 for transaction data will be referred to as a "super chaotic block" or "SC block" or "SCB." In addition to the SCB, the first memory 130 can store other (transitory or non-transitory) data.

If a write-abort occurs during an open session (e.g., because of a power cycle or a "cancel session" command), the data written to the first memory device 130 during the open session is discarded (i.e., the SC block is erased) (state 315), and the memory device 100 is returned to the idle state (state 300). If a write-abort does not occur during the writing of the atomic transaction data to the first memory 130, a "closed session" command is received at the end of the atomic transaction, causing the memory device 100 to operate in a closed session (state 320). During a closed session, data is written to the user-LBA space in the second memory 140 instead of the first memory 130. In response to a flush command, the flushing operation takes place (state 330), and when the flushing operation is complete, the memory device 100 returns to the idle mode (state 300). If a write-abort occurs during the flushing operation (e.g., because of a power cycle), the flushing operation is aborted (state 340) and will be reattempted in response to a "flush" command. Through these states, the memory device 100 allows secure sessions to be tolerant of write-aborts.

Figure 4:
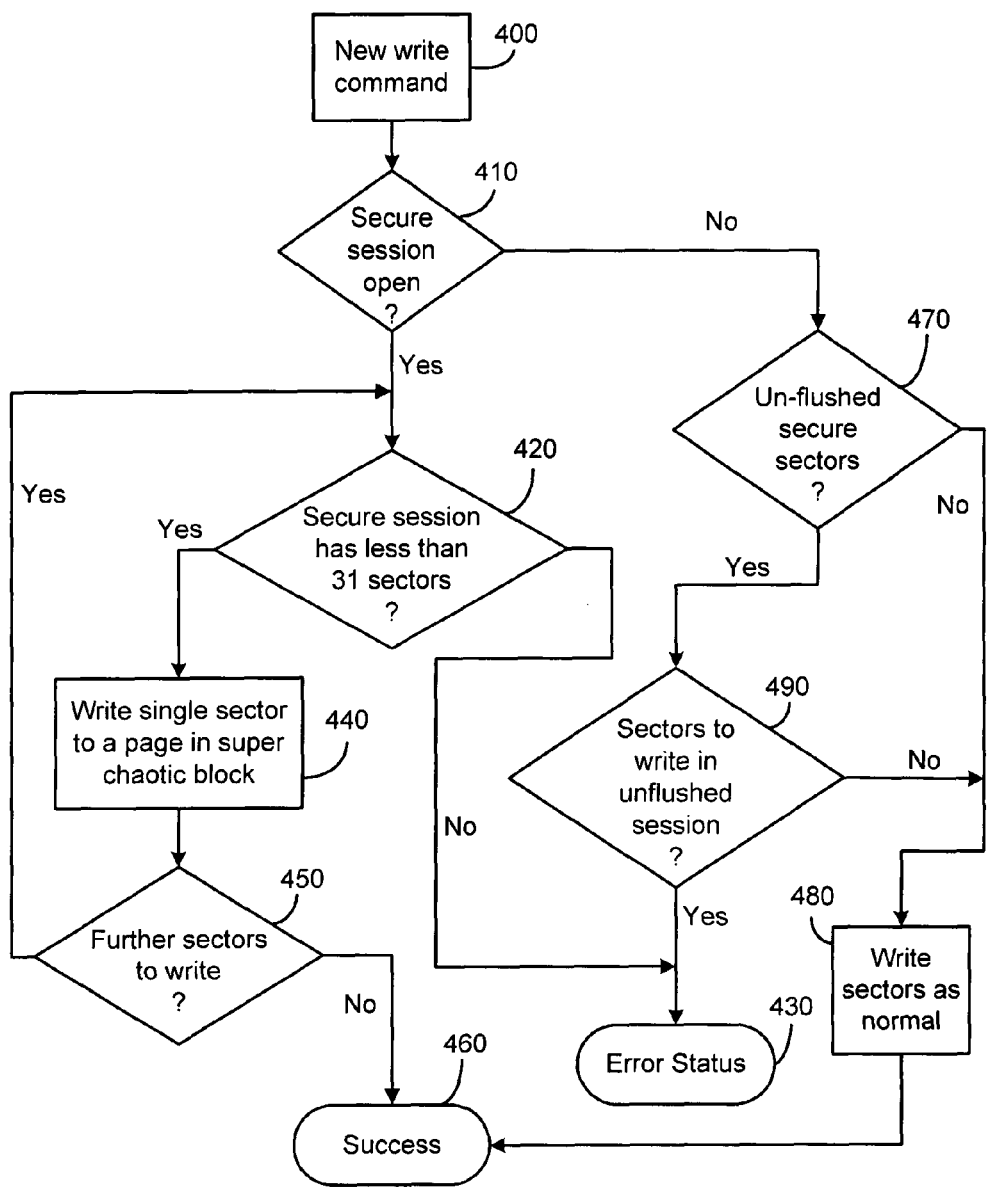
FIG. 4 is a flow chart of an embodiment for writing data to a memory device.

The flow chart of FIG. 4 will now be discussed to illustrate the various write scenarios that can occur when the memory device 100 is in the various states. When a new write command is received (act 400), the circuitry 120 determines whether or not a secure session is open (act 410). (A "secure session was referred to as an "open" session in FIG. 3.) If a secure session is open, the circuitry 120 then determines if the secure session resulted in less than 63 sectors being written to the super chaotic block (act 420). (63 sectors is the maximum size of the super chaotic block in this example; of course, a different maximum size can be used.) If the secure session does not have less than 63 sectors in the super chaotic block (i.e., the super chaotic block is maxed out), an error occurs (act 430). If the secure session does have less than 63 sectors (i.e., there is room in the super chaotic block), the circuitry 120 writes a single sector to a page in the super chaotic block (act 440). If there are further sectors to write (act 450), the process returns to act 420; otherwise, success is indicated (act 460).

Going back to act 410, if a secure session was not open when the new write command was received, the circuitry 120 determines whether there are un-flushed secure sectors in the super chaotic block (act 470). This can occur if there was a write-abort during the open/secure session or during the flushing operation (states 310 and 330 in FIG. 3). If there are no un-flushed secure sectors in the super chaotic block, the sectors are written to the second memory 140 as normal (i.e., without regard to the super chaotic block) (act 480). However, if there are un-flushed secure sectors in the super chaotic block, the circuitry 120 determines whether the sectors that are to be written in the write operation are the same sectors as in the un-flushed session (act 490). If they are, a conflict will occur when the un-flushed sectors are flushed. In that situation, an error status is returned (act 430). On the other hand, if the sectors are not the same as in the un-flushed session, the write operation proceeds (act 480).

Figure 5:
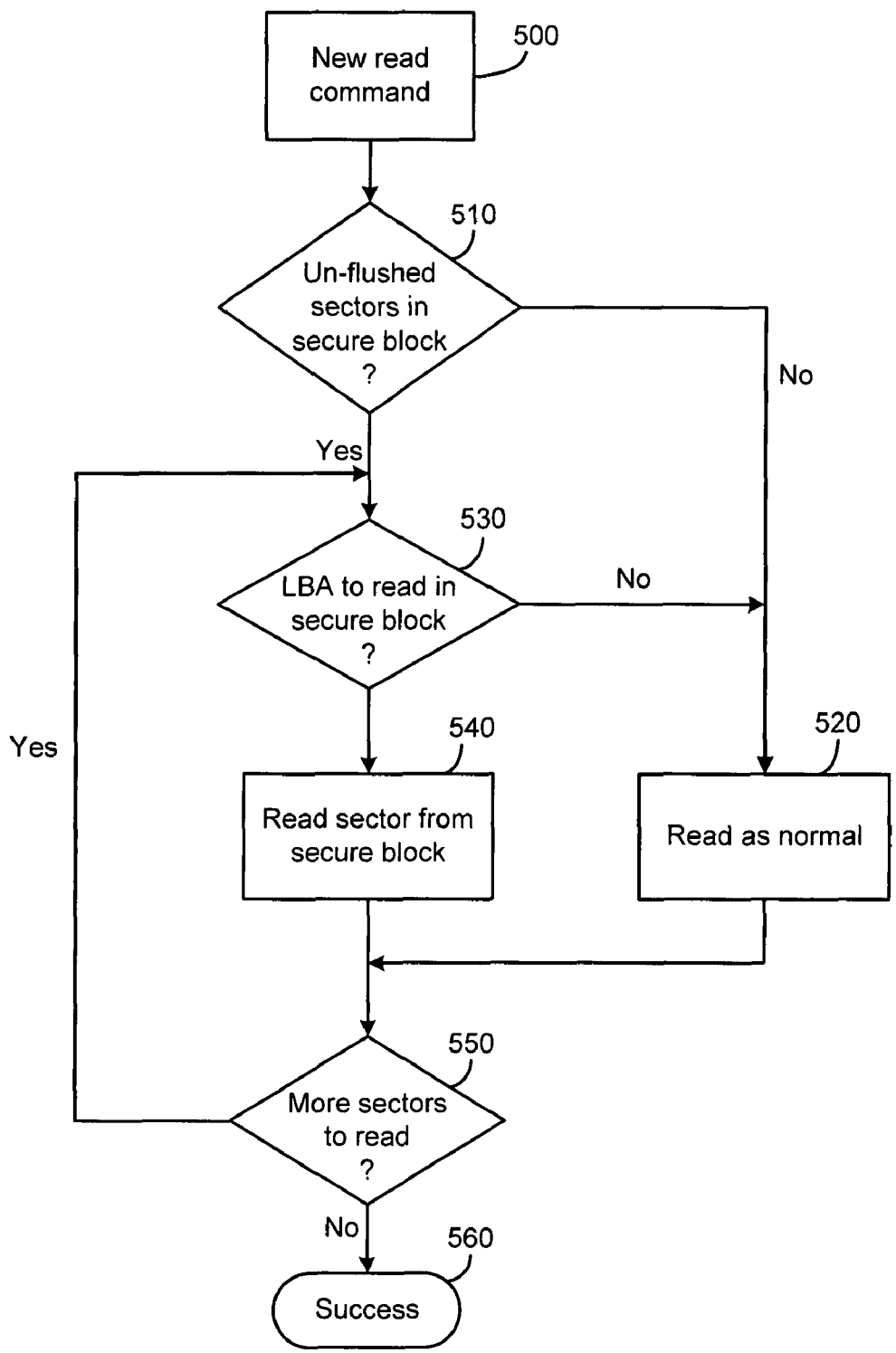
FIG. 5 is a flow chart of an embodiment for reading data from a memory device.

The flow chart of FIG. 5 will now be discussed to illustrate the various read scenarios that can occur when the memory device 100 is in the various states. When a new read command is received (act 500), the circuitry 120 determines whether or not there are un-flushed secure sectors in the super chaotic block (act 510). This can occur if there was a write-abort during the open/secure session or during the flushing operation (states 310 and 330 in FIG. 3). If there are no un-flushed secure sectors in the super chaotic block, the read operation proceeds as normal (i.e., without regard to the super chaotic block) (act 520). However, if there are un-flushed secure sectors in the super chaotic block, the circuitry 120 determines whether the logical block address (LBA) associated with the read command is in the secure block (act 530). If the LBA is not in the secure block, the read operation proceeds as normal, with the requested sector being read from the second memory 140 (act 520). If the LBA is in the secure block, the sector is read from the secure block instead of the second memory 140 (act 540). A determination is then made regarding whether there are more sectors to read (act 550). If there are more sectors to read, the process returns to act 530. If there are no more sectors to read, success is indicated (act 560).

Figure 6:
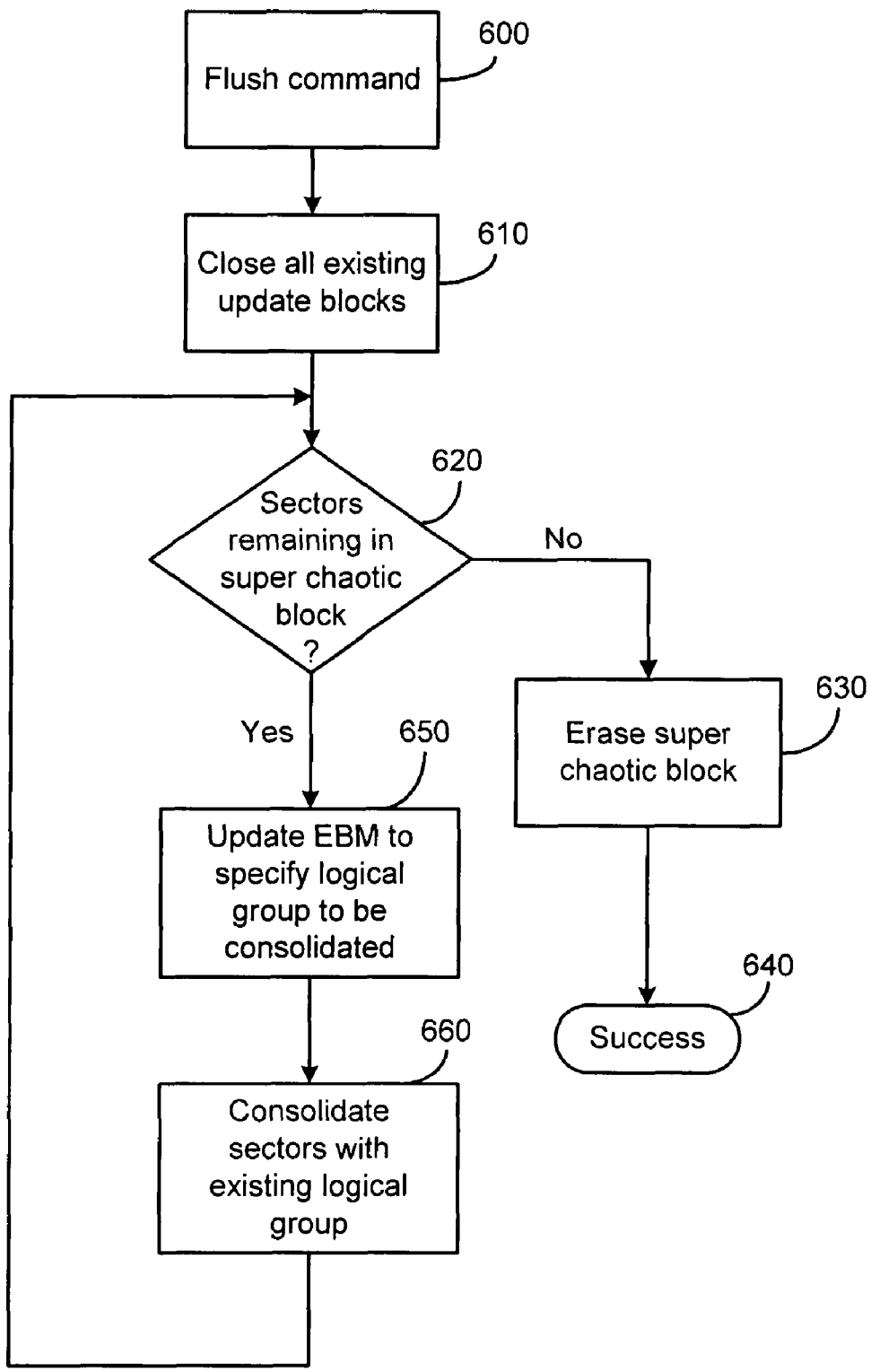
FIG. 6 is a flow chart of an embodiment for flushing data from a first memory to a second memory of a memory device.

The flow chart of FIG. 6 will now be discussed to illustrate the flushing operation. The flow chart can be used when flushing a recently-closed session or when flushing after write-abort. However, in the case of write-abort recovery, any partially-consolidated logical groups are preferably erased upon start-up. Turning now to FIG. 6, in response to a flush command (act 600), all existing update blocks are closed (act 610). The circuitry 120 then determines if there are any sectors remaining in the super chaotic block (act 620). If there are no more sectors remaining in the super chaotic block, the super chaotic block is erased (act 630), and success is indicated (act 640). If there are sectors remaining in the super chaotic block, the erase block manager (EBM) is updated to specify the logical groups to be consolidated (act 650), and the sectors are consolidated with the existing logical group (act 660). The process then continues with act 620.

The following paragraph describes details of a presently preferred embodiment. These details are intended merely to illustrate this embodiment and should not be read into the claims. When a secure write-abort session is opened by the circuitry 120, the circuitry 120 preferably closes all open update blocks in order to clear out the erase block manager (EBM) and opens the super chaotic block. In this embodiment, the super chaotic block allows a maximum of 63 sector writes, and the super chaotic block preferably keeps an array of all possible 63 LBAs written during the secure session. When the close command is sent, a "SuperChaoticUpdateDone Sector" is preferably written to the 32nd sector in the meta-block including a copy of this array. This avoids having to scan the super chaotic block to determine all LBAs at initialization or flush time. Writes to the super chaotic block can be from any logical group within the LBA space. Preferably, a program error in the super chaotic block causes a rewrite of the entire block. Also, writes to the super chaotic block are preferably stored one sector at a time, with each sector being stored in a single page of the super chaotic block. It is presently preferred that multi-plane or cached programming not be used. Preferably, entries in the super chaotic block are written in the same manner as other control blocks to the first memory 130 to minimize the possibility of the data becoming unreadable. The same sector may be stored in the super chaotic block more than once. Accordingly, when reading from a super chaotic block, it is preferred that the sectors be scanned to ensure that a later version does not exist in the super chaotic block.

Preferably, all open update blocks are closed before the flush of the secure session. Flushing these updates simplifies the consolidation of the logical group. When flushing the super-chaotic block, it is preferred that all sectors contained in the super chaotic block from a logical group be consolidated in a single consolidation. The EBM can be updated before this operation to indicate which logical group is being updated. On power-up after a write-abort, partially-completed consolidation blocks from the previous flush are preferably erased in order to free update block resources. When these blocks are erased, the EBM is preferably updated to reflect that the consolidation of the erased block was not completed. This will guard against the case where a legacy host opens an update block on the erased logical group. After a successful flush, the super chaotic block is preferably erased, as the data stored preferably should not be re-used.

It should be understood that there are many alternatives to the above embodiments. For example, these embodiments can be used to protect any data from write-aborts, not just data of an atomic transaction. Accordingly, "atomic transaction" should not be read into the claims unless explicitly recited therein. Also, while the circuitry 120 was described as performing various tasks, some or all of those tasks can be performed by other components of the memory device or by the host device. Further, the performance of these tasks can be distributed between the memory device and host device (or some other entity). Additionally, as noted above, the first and second memories can take any form and do not necessarily need to take the specific forms from the above examples. For example, instead of taking the form of a super chaotic block, the first memory can take the form of update blocks, which can be otherwise used to store updated data. In other words, the first memory can comprise a special memory area used only when writing data of an atomic transaction (e.g., one or more super chaotic blocks), or the first memory can comprise a memory area that is also used for purposes other than writing data of an atomic transaction (e.g., one or more update blocks).

It is intended that the foregoing detailed description be understood as an illustration of selected forms that the invention can take and not as a definition of the invention. It is only the following claims, including all equivalents, that are intended to define the scope of this invention. It should be noted that the acts recited in the claims can be performed in any order—not necessarily in the order in which they are recited. Finally, it should be noted that any aspect of any of the preferred embodiments described herein can be used alone or in combination with one another.

What is claimed is:

1. A method for writing data of an atomic transaction to a memory device, the method comprising:
   (a) determining that the memory device is in a secure session and in response:
      (a1) determining whether a designated area in a first memory of the memory device for the secure session is full, wherein the designated area of the first memory is a reserved memory area used only for writing data of an atomic transaction;
      (a2) when the designated area is not full, writing the data of the atomic transaction to the first memory in the memory device, but otherwise returning an error status and refraining from writing the data of the atomic transaction to the first memory;
   (b) determining whether all of the data of the atomic transaction was written to the first memory;
   (c) only when it is determined that all of the data of the atomic transaction was written to the first memory:
      (c1) reading the data of the atomic transaction from the first memory; and
      (c2) writing the data of the atomic transaction read from the first memory to a second memory in the memory device;
      (c3) after a power loss, determining whether all of the data of the atomic transaction read from the first memory was written to the second memory; and
      (c4) when all of the data of the atomic transaction read from the first memory was not written to the second memory, repeating (c1) and (c2); and
   (d) when all of the data of the atomic transaction was not written to the first memory, discarding any data written to the first memory;
   wherein the first and second memories are non-volatile memories.

2. The method of claim 1, wherein an indicator is written when all of the data of the atomic transaction is completely written to the first memory, and wherein (b) comprises determining whether the indicator was written.

3. The method of claim 2, wherein (a) is performed after a begin transaction command is received, and wherein the indicator is written after an end transaction command is received.

4. The method of claim 1, wherein the second memory, but not the first memory, is accessible by a user.

5. The method of claim 1, wherein the data comprises a plurality of sectors.

6. The method of claim 1, wherein (c1) and (c2) are performed only in response to a command received after the memory device is initialized.

7. A method for writing data of an atomic transaction to a memory device, the method comprising:
  (a) determining that a memory device is in a secure session and in response:
    (a1) determining whether a designated area in a first memory of the memory device for the secure session is full, wherein the designated area of the first memory is a reserved memory area used only for writing data of an atomic transaction;
    (a2) when the designated area is not full, writing the data of the atomic transaction to the first memory in the memory device, but otherwise returning an error status and refraining from writing the data of the atomic transaction to the first memory;
    wherein the first memory is outside of a logical block address (LBA) space of a second memory in the memory device, and wherein the first memory is smaller than the second memory;
  (b) determining whether a write-abort occurred during the writing of the data of the atomic transaction to the first memory;
  (c) when it is determined that a write-abort did not occur:
    (c1) reading the data of the atomic transaction from the first memory; and
    (c2) writing the data of the atomic transaction read from the first memory to a second memory in the memory device;
    (c3) after a power loss, determining whether all of the data of the atomic transaction read from the first memory was written to the second memory; and
    (c4) when all of the data of the atomic transaction read from the first memory was not written to the second memory, repeating (c1) and (c2); and
  (d) when it is determined that a write-abort occurred, discarding any data written to the first memory;
  wherein the first and second memories are non-volatile memories.

8. The method of claim 7, wherein an indicator is written when all of the data of the atomic transaction is completely written to the first memory, and wherein (b) comprises determining whether the indicator was written.

9. The method of claim 8, wherein (a) is performed after a begin transaction command is received, and wherein the indicator is written after an end transaction command is received.

10. The method of claim 7, wherein the data comprises a plurality of sectors.

11. The method of claim 7, wherein (c1) and (c2) are performed only in response to a command received after the memory device is initialized.

12. A memory device comprising:
a first memory;
a second memory; and
circuitry operative to:
  (a) determine that the memory device is in a secure session and in response:
    (a1) determine whether a designated area in the first memory for the secure session is full, wherein the designated area of the first memory is a reserved memory area used only for writing data of an atomic transaction;
    (a2) when the designated area is not full, write the data of the atomic transaction to the first memory, but otherwise return an error status and refrain from writing the data of the atomic transaction to the first memory;
  (b) determine whether all of the data of the atomic transaction was written to the first memory;
  (c) only when it is determined that all of the data of the atomic transaction was written to the first memory:
    (c1) read the data of the atomic transaction from the first memory;
    (c2) write the data of the atomic transaction read from the first memory to the second memory;
    (c3) after a power loss, determine whether all of the data of the atomic transaction read from the first memory was written to the second memory; and
    (c4) when all of the data of the atomic transaction read from the first memory was not written to the second memory, repeat (c1) and (c2); and
  (d) when all of the data of the atomic transaction was not written to the first memory, discard any data written to the first memory;
  wherein the first and second memories are non-volatile memories.

13. The memory device of claim 12, wherein the circuitry is further operative to write an indicator if all of the data of the atomic transaction is completely written to the first memory, and wherein the circuitry is operative to perform (b) by determining whether the indicator was written.

14. The memory device of claim 13, wherein the circuitry is operative to perform (a) after a begin transaction command is received, and wherein the circuitry is operative to write the indicator after an end transaction command is received.

15. The memory device of claim 12, wherein the second memory, but not the first memory, is accessible by a user.

16. The memory device of claim 12, wherein the data comprises a plurality of sectors.

17. The memory device of claim 12, wherein (c1) and (c2) are performed only in response to a command received after the memory device is initialized.

18. A memory device comprising:
a first memory;
a second memory, wherein the first memory is outside of a logical block address (LBA) space of the second memory, and wherein the second memory is larger than the first memory; and
circuitry operative to:
  (a) determine that a memory device is in a secure session and in response:
    (a1) determine whether a designated area in the first memory for the secure session is full, wherein the designated area of the first memory is a reserved memory area used only for writing data of an atomic transaction;
    (a2) when the designated area is not full, write the data of the atomic transaction to the first memory in the memory device, but otherwise return an error status and refrain from writing data of the atomic transaction to the first memory;
    wherein the first memory is outside of a logical block address (LBA) space of a second memory in the memory device, and wherein the first memory is smaller than the second memory;
  (b) determine whether a write-abort occurred during the writing of the data of the atomic transaction to the first memory;
  (c) when it is determined that a write-abort did not occur:

(c1) read the data of the atomic transaction from the first memory; and
(c2) write the data of the atomic transaction read from the first memory to a second memory in the memory device;
(c3) after a power loss, determine whether all of the data of the atomic transaction read from the first memory was written to the second memory; and
(c4) when all of the data of the atomic transaction read from the first memory was not written to the second memory, repeat (c1) and (c2); and
(d) when it is determined that a write-abort occurred, discard any data written to the first memory;
wherein the first and second memories are non-volatile memories.

19. The memory device of claim 18, wherein the circuitry is further operative to write an indicator if all of the data of the atomic transaction is completely written to the first memory, and wherein the circuitry is operative to perform (b) by determining whether the indicator was written.

20. The memory device of claim 19, wherein the circuitry is operative to perform (a) after a begin transaction command is received, and wherein the circuitry is operative to write the indicator after an end transaction command is received.

21. The memory device of claim 18, wherein the data comprises a plurality of sectors.

22. The memory device of claim 18, wherein (c1) and (c2) are performed only in response to a command received after the memory device is initialized.

* * * * *